(12) United States Patent
Urano (10) Patent No.: US 8,855,816 B2
(45) Date of Patent: Oct. 7, 2014

(54) PIEZOELECTRIC ACTUATOR, ROBOT HAND, AND ROBOT

(75) Inventor: Osamu Urano, Okaya (JP)

(73) Assignee: Seiko Epson Corporation (JP)

( * ) Notice: Subject to any disclaimer, the term of this patent is extended or adjusted under 35 U.S.C. 154(b) by 302 days.

(21) Appl. No.: 13/489,947

(22) Filed: Jun. 6, 2012

(65) Prior Publication Data

US 2012/0316675 A1    Dec. 13, 2012

(30) Foreign Application Priority Data

Jun. 10, 2011  (JP) ................................ 2011-129878

(51) Int. Cl.
*G06F 19/00*  (2011.01)
*H02N 2/00*   (2006.01)
*H02N 2/14*   (2006.01)
*H02N 2/10*   (2006.01)
*B25J 15/00*  (2006.01)

(52) U.S. Cl.
CPC ................. *H02N 2/14* (2013.01); *H02N 2/003* (2013.01); *H02N 2/103* (2013.01); *B25J 15/0009* (2013.01)
USPC ........................................................ 700/245

(58) Field of Classification Search
USPC ................................... 700/245; 310/316–317
See application file for complete search history.

(56) References Cited

U.S. PATENT DOCUMENTS

| | | | |
|---|---|---|---|
| 4,925,303 A | 5/1990 | Pusic | |
| 4,995,722 A | 2/1991 | Sutour | |
| 5,130,619 A * | 7/1992 | Izuno | 318/116 |
| 5,563,478 A * | 10/1996 | Suganuma | 318/116 |
| 6,265,809 B1 * | 7/2001 | Fujii et al. | 310/317 |
| 6,437,480 B1 * | 8/2002 | Saya | 310/316.01 |
| 7,119,475 B2 | 10/2006 | Matsuzaki et al. | |
| 7,535,153 B2 | 5/2009 | Urano | |
| 7,545,076 B1 * | 6/2009 | Hills et al. | 310/317 |
| 7,675,218 B2 * | 3/2010 | Kawaguchi et al. | 310/317 |

(Continued)

FOREIGN PATENT DOCUMENTS

| | | |
|---|---|---|
| EP | 0359663 A1 | 3/1990 |
| EP | 1555545 A1 | 7/2005 |

(Continued)

OTHER PUBLICATIONS

PCT/ISA/210—International Search Report—Mar. 5, 2010.

(Continued)

*Primary Examiner* — Khoi Tran
*Assistant Examiner* — Harry Oh
(74) *Attorney, Agent, or Firm* — Harness, Dickey & Pierce, P.L.C.

(57) ABSTRACT

A piezoelectric actuator includes a frequency controller that controls the frequency and power of the driving signal, wherein when the phase difference falls within a predetermined range, the control unit stores the value of the frequency of the driving signal as a first frequency memory value, sets a voltage to a upper limit voltage value, and performs control of adjusting the frequency of the driving signal so that the phase difference is maintained to be within a predetermined range, and when the frequency of the driving signal is changed from the first frequency memory value by an amount exceeding a first value determined in advance, the control unit stores the value of the frequency of the driving signal as a second frequency memory value and sets the voltage to a lower limit voltage value lower than the upper limit voltage value.

5 Claims, 8 Drawing Sheets

(56) References Cited

U.S. PATENT DOCUMENTS

| | | |
|---|---|---|
| 2005/0110368 A1* | 5/2005 | Varadi et al. ............. 310/316.02 |
| 2005/0127790 A1* | 6/2005 | Magnussen et al. .......... 310/328 |
| 2005/0231069 A1* | 10/2005 | Yamazaki et al. ............ 310/317 |
| 2006/0113863 A1* | 6/2006 | Kawaguchi et al. .......... 310/314 |
| 2007/0046144 A1* | 3/2007 | Urano ........................... 310/317 |
| 2007/0159507 A1* | 7/2007 | Urano ............................. 347/20 |
| 2007/0194660 A1* | 8/2007 | Hashimoto .............. 310/316.01 |
| 2009/0066187 A1* | 3/2009 | Kudo ....................... 310/316.02 |
| 2009/0206699 A1* | 8/2009 | Osano ........................... 310/317 |
| 2009/0224630 A1* | 9/2009 | Adachi et al. ................. 310/317 |
| 2010/0177603 A1* | 7/2010 | Kitahara et al. ................ 368/80 |
| 2012/0228994 A1* | 9/2012 | Wischnewskiy et al. ..... 310/317 |

FOREIGN PATENT DOCUMENTS

| | | |
|---|---|---|
| JP | 09-065673 | 3/1997 |
| JP | 09-163764 | 6/1997 |
| JP | 2000-092869 | 3/2000 |
| JP | 2003-033056 | 1/2003 |
| JP | 2007-151378 | 6/2007 |
| JP | 2009-219212 | 9/2009 |
| WO | WO2004/088830 | 10/2004 |
| WO | WO-2008061307 A1 | 5/2008 |

OTHER PUBLICATIONS

PCT/ISA/237—Written Opinion of the International Searching Authority—Mar. 5, 2010.

* cited by examiner

PIEZOELECTRIC ACTUATOR, ROBOT HAND, AND ROBOT

BACKGROUND

1. Technical Field

The invention relates to a piezoelectric actuator, a robot hand, and a robot.

2. Related Art

A piezoelectric actuator which uses resonance of a vibrating body including a piezoelectric device is known (for example, see JP-A-2000-092869). In such a piezoelectric actuator, a control unit performs control so that the frequency of a driving signal supplied to a vibrating body approaches a resonance frequency, and a phase difference between the driving signal and a detection signal obtained from a vibrating state of the vibrating body becomes substantially constant at a value appropriate for driving. In this way, a stable driving state where a driven body rotates stably is maintained.

The piezoelectric actuator (ultrasonic motor) disclosed in JP-A-2000-092869 includes a switching means for switching a driving circuit and a temperature sensor (thermistor) detecting the temperature of a transformer. When the temperature of the switching means or the transformer increased to a certain temperature or higher, the temperature rise is prevented by stopping or decreasing the output to thereby improve reliability.

However, the resonance frequency of the vibrating body varies with a change of a surrounding temperature or a load, and the resonance frequency decreases as the temperature increases. When the resonance frequency decreases, the amplitude of the vibrating body decreases, and the rotating speed of the driven body decreases. Thus, when the power of the driving signal is increased in order to maintain the rotating speed, the vibrating body generates heat so that the temperature increases further, and the resonance frequency decreases further. This occurs repeatedly so that the system goes into a negative control chain. As a result, there are cases were the vibrating body may be damaged.

In contrast, in the piezoelectric actuator disclosed in JP-A-2000-092869, since the piezoelectric actuator does not include a temperature sensor detecting the temperature of the vibrating body, it is not possible to detect a temperature rise in the vibrating body. Moreover, even when the piezoelectric actuator includes a temperature sensor detecting the temperature of the vibrating body, the circuit configuration of the control unit becomes complicated as compared to when the temperature sensor is not included. Thus, it is difficult to decrease the size and weight of the piezoelectric actuator, and the cost increases.

SUMMARY

An advantage of some aspects of the invention is to solve at least a part of the problems described above, and the invention can be implemented as the following forms or application examples.

Application Example 1

This application example of the invention is directed to a piezoelectric actuator including: a rectangular vibrating body that includes a piezoelectric device; a driving unit that supplies a driving signal to the piezoelectric device; a phase difference detector that detects a phase difference between the driving signal and a detection signal detected based on vibration of the vibrating body; and a control unit that controls the frequency and power of the driving signal, wherein when the frequency of the driving signal is changed so that the phase difference falls within a predetermined range, the control unit stores the value of the frequency as a first frequency memory value, sets the power of the driving signal to a predetermined value, and performs control of adjusting the frequency of the driving signal so that the phase difference is maintained to be within the predetermined range, and when the frequency of the driving signal is changed from the first frequency memory value by an amount exceeding a first value determined in advance based on temperature characteristics of a resonance frequency of the vibrating body, the control unit sets the power of the driving signal to a value smaller than the predetermined value.

In the above piezoelectric actuator, the power of the driving signal is set to the predetermined value when the phase difference is controlled to be within the predetermined range by the sweeping control of changing the frequency of the driving signal, and the power is set to a value smaller than the predetermined value when the frequency of the driving signal is changed from the first frequency memory value by an amount exceeding the first value. Therefore, by setting a difference between the value of the frequency of the driving signal when the phase difference has reached a predetermined phase difference range where the piezoelectric actuator operates stably and the value of the frequency of the driving signal corresponding to the upper limit temperature at which the piezoelectric actuator can operate stably as a first value in advance, when the frequency of the driving signal is changed from the first frequency memory value which is a value when the phase difference reaches the predetermined phase difference range by an amount exceeding the first value based on the temperature characteristics of the resonance frequency of the vibrating body, it can be predicted that there is a high possibility that the temperature of the piezoelectric actuator has reached the upper limit of the temperature range where the piezoelectric actuator operates stably. In such a case, since the power of the driving signal is set to a value smaller than the predetermined value, it is possible to suppress a temperature rise in the piezoelectric actuator. In this way, the piezoelectric actuator can operate stably. Moreover, since it is possible to predict a temperature rise from the variation amount of a frequency, it is possible to eliminate the necessity of a temperature sensor and to realize a decrease of the size and weight of the piezoelectric actuator easily.

Application Example 2

In the piezoelectric actuator according to the above application example, it is preferable that when the frequency of the driving signal is changed from the first frequency memory value by an amount exceeding the first value, the control unit stores the changed value of the frequency as a second frequency memory value, and when the frequency of the driving signal is changed from the second frequency memory value by an amount exceeding a second value determined in advance based on the temperature characteristics, the control unit sets the power of the driving signal to zero.

In this configuration, by setting a difference between the value of the frequency of the driving signal corresponding to the upper limit temperature where the piezoelectric actuator can operate stably and the value of the frequency of the driving signal corresponding to the upper limit temperature at which the piezoelectric actuator can operate properly as a second value in advance, when the frequency is changed from the second frequency memory value which is the value when the temperature reaches the upper limit temperature at which the piezoelectric actuator can operate stably by an amount exceeding the second value based on the temperature characteristics of the resonance frequency of the vibrating body, it is possible to predict that there is a high possibility that the temperature of the piezoelectric actuator has reached the upper limit of the temperature range where the piezoelectric actuator can operate properly. In such a case, since the power of the driving signal is set to zero, it is possible to suppress a further temperature rise in the piezoelectric actuator and to suppress an abnormal operation, damage, or the like of the piezoelectric actuator.

Application Example 3

In the piezoelectric actuator according to the above application example, it is preferable that the control unit changes the frequency of the driving signal from a resonance frequency side where impedance is high toward a resonance frequency side where impedance is low among a resonance frequency of longitudinal vibration in which the vibrating body expands and contracts in a longitudinal direction of the vibrating body and a resonance frequency of flexural vibration in which the vibrating body expands and contracts in the lateral direction of the vibrating body.

In this configuration, since the frequency of the driving signal is changed from the resonance frequency side where impedance is high to the resonance frequency side where impedance is low, it is possible to decrease the possibility that the frequency of the driving signal passes through a resonance frequency where the impedance is low in the sweeping state. In this way, it is possible to prevent an excessive increase of the current of the piezoelectric actuator and a temperature rise caused by the increase of the current.

Application Example 4

This application example of the invention is directed to a robot hand including the above piezoelectric actuator.

In this configuration, since the robot hand includes the piezoelectric actuator which is small and light and which is capable of being activated in a stable state, it is possible to provide a robot hand which is small and light and which performs a pivot operation of the fingers grasping a member in a stable state.

Application Example 5

This application example of the invention is directed to a robot including the above robot hand.

In this configuration, it is possible to provide a robot which is small and light and which can perform the pivot operation of fingers grasping a member in a stable state.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a piezoelectric actuator according to an embodiment of the invention will be described with reference to the accompanying drawings. In the respective reference drawings, the scales and dimensions of respective constituent components may be sometimes different from those of the actual constituent components so that the structure thereof can be understood easily.

First Embodiment

Piezoelectric Actuator

Figure 1A:
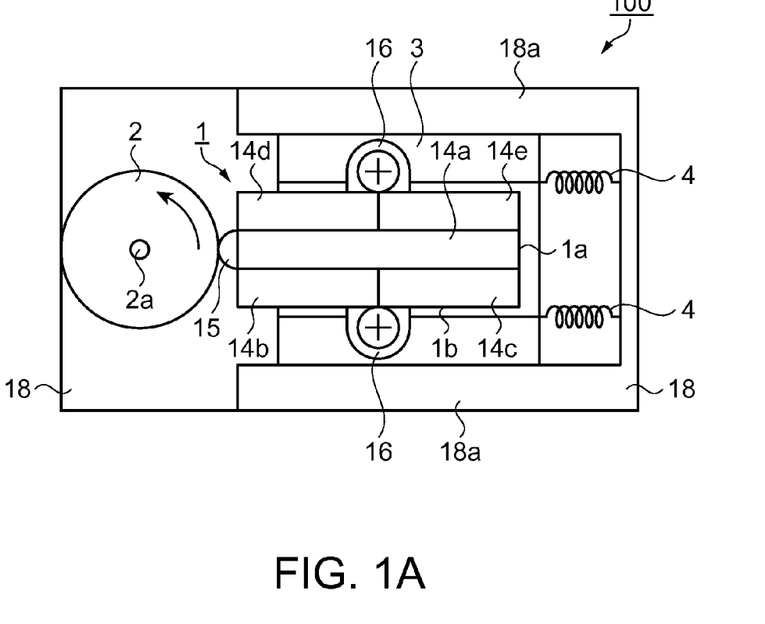
FIGS. 1A and 1B are schematic diagrams illustrating the configuration of a piezoelectric actuator according to a first embodiment.
Figure 1B:
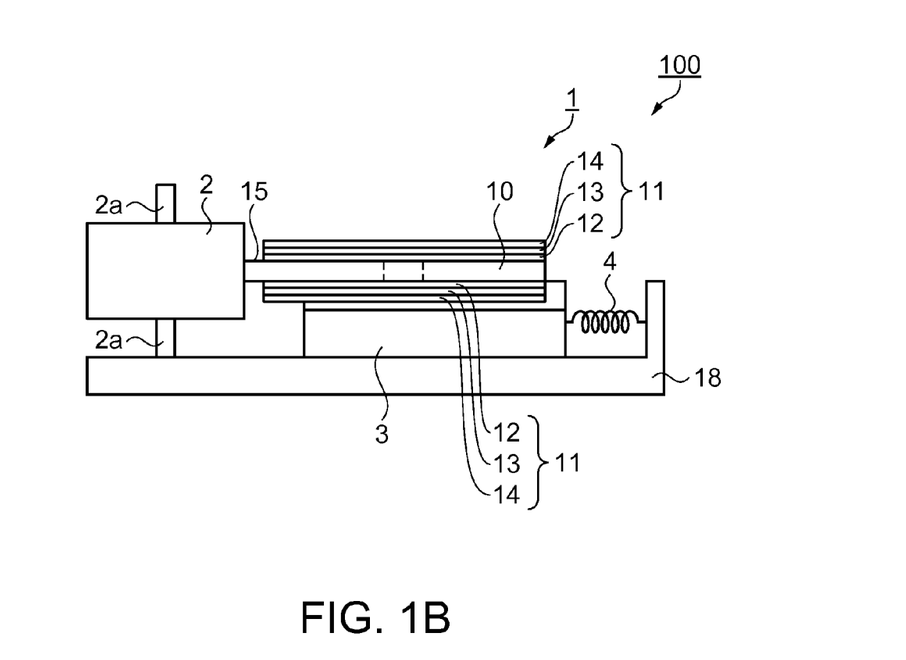

First, a schematic configuration of a piezoelectric actuator according to a first embodiment will be described. FIGS. 1A and 1B are schematic diagrams illustrating the configuration of the piezoelectric actuator according to the first embodiment. Specifically, FIG. 1A is a plan view of the piezoelectric actuator, and FIG. 1B is a side view of the piezoelectric actuator.

Figure 3:
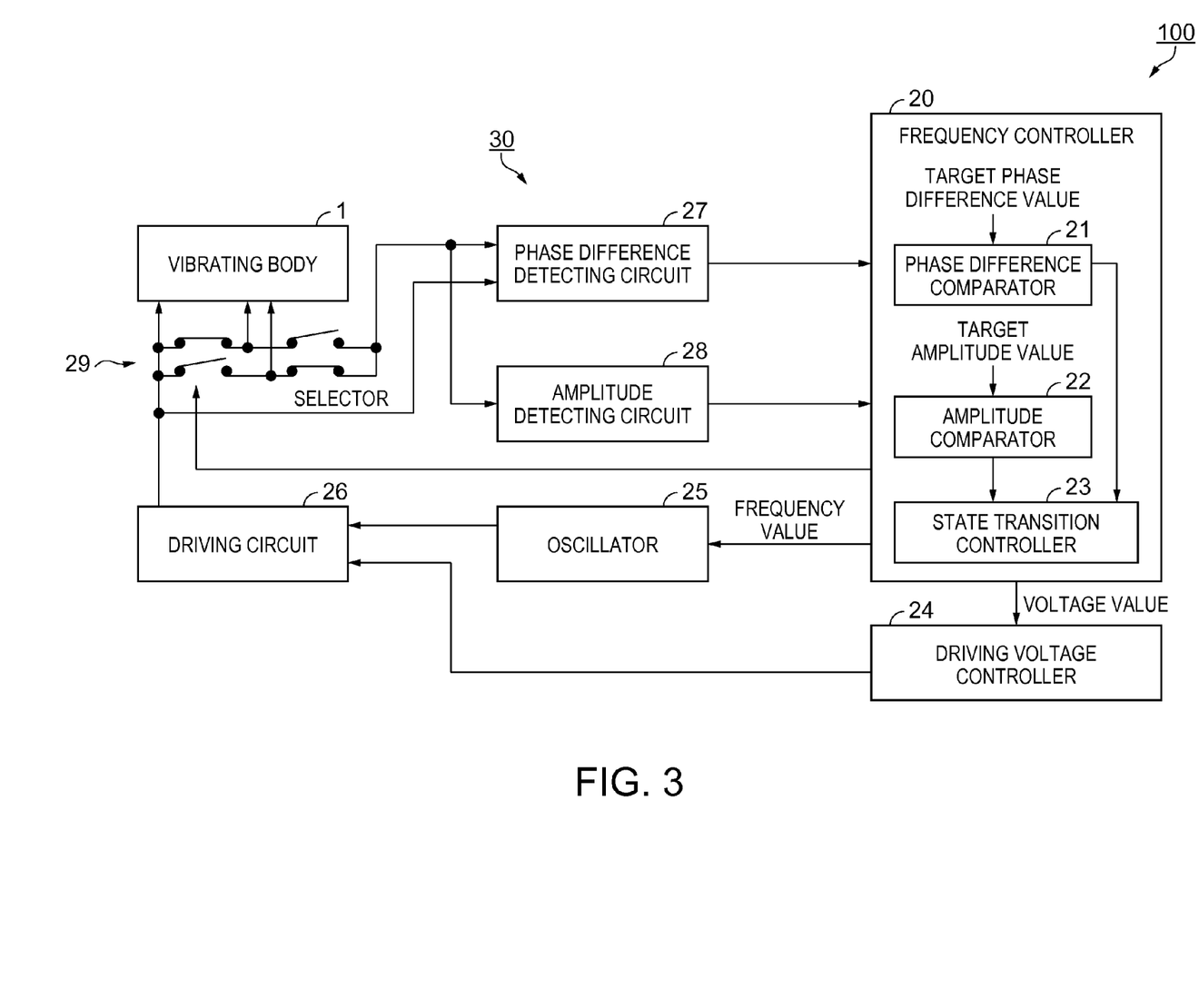
FIG. 3 is a block diagram illustrating the configuration of a driving controller of the piezoelectric actuator according to the first embodiment.

As illustrated in FIGS. 1A and 1B, a piezoelectric actuator 100 includes a vibrating body 1, a rotor 2, a holding member 3, a bias spring 4, a base 18, and a driving controller (see FIG. 3). The piezoelectric actuator 100 is a piezoelectric motor including a rotating rotor 2 as a driven body. The vibrating body 1, the rotor 2, the holding member 3, and the bias spring 4 are formed on the base 18.

As illustrated by a plan view in FIG. 1A, the vibrating body 1 has an approximately rectangular shape having a short side 1a and a long side 1b. In the following description, a direction along the short side 1a will be referred to as a lateral direction, and a direction along the long side 1b will be referred to as a longitudinal direction. As illustrated in FIG. 1B, the vibrating body 1 is a stacked body in which a vibrating plate 10 and a pair of piezoelectric devices 11 disposed on both the front and rear surfaces of the vibrating plate 10, respectively.

The vibrating plate 10 is formed of a planar member made from a rigid material such as a metal or a resin, and for example, is made from a stainless steel having a conductive property. The pair of piezoelectric devices 11 is fixed to the vibrating plate 10 by a fixing means such as an adhesive or an alloy solder. The piezoelectric device 11 includes a piezoelectric layer 13, a first electrode 12, and a second electrode 14.

The piezoelectric layer 13 is formed in a planar shape. The piezoelectric layer 13 is made from a piezoelectric material exhibiting an electromechanical transduction effect, and for example, is formed using a metal oxide having a perovskite structure expressed by $ABO_3$ as a material. Examples of such a metal oxide include lead zirconate titanate ($Pb(Zr,Ti)O_3$: PZT) and lithium niobate ($LiNbO_3$).

The first electrode 12 is provided on a side of the piezoelectric layer 13 close to the vibrating plate 10 and is formed over the approximately entire surface of the piezoelectric layer 13. The first electrode 12 serves as a common electrode of the piezoelectric device 11. The first electrodes 12 of the pair of piezoelectric devices 11 are electrically connected via the vibrating plate 10. The first and second electrodes 12 and 14 are formed by deposition, sputtering, or the like using a conductive metal such as Ni, Au, or Ag as a material.

The second electrode 14 is provided on a side of the piezoelectric layer 13 opposite to the first electrode 12 and is divided in the in-plane direction into multiple sub-electrodes by a groove. As illustrated in FIG. 1A, this groove approximately equally divides the second electrode 14 in the lateral direction of the piezoelectric device 11 into three sub-electrodes, and each of two sub-electrodes on both outer sides in the lateral direction among the three divided sub-electrodes is further approximately equally divided in the longitudinal direction into two sub-electrodes. In this way, the second electrode 14 is divided into five electrode portions of electrode portions 14a, 14b, 14c, 14d, and 14e. The electrode portions 14a, 14b, 14c, 14d, and 14e are electrically separated from each other as individual electrodes.

The electrode portion 14a disposed at the center in the lateral direction among the five electrode portions of the second electrode 14 functions as a longitudinal vibration electrode. The electrode portions 14b and 14e disposed on both outer sides in the lateral direction of the electrode portion 14a so as to form a diagonal pair with the electrode portion 14a interposed therebetween function as first flexural vibration electrodes. Moreover, the electrode portions 14c and 14d disposed so as to form a diagonal pair crossing the diagonal pair of the electrode portions 14b and 14e with the electrode portion 14a interposed therebetween function as second flexural vibration electrodes.

In the piezoelectric device 11, a region where the electrode portion 14a is disposed serves as a longitudinal vibration excitation region which excites longitudinal vibration in the longitudinal direction of the piezoelectric device 11. In contrast, each of regions on both sides in the lateral direction of the longitudinal vibration excitation region, where the electrode portions 14b and 14e and the electrode portions 14c and 14d are disposed, respectively, serves as a flexural vibration excitation region which excites flexural vibration in the lateral direction of the piezoelectric device 11.

The first electrode 12 and the second electrode 14 (the electrode portions 14a, 14b, 14c, 14d, and 14e) are electrically connected to the driving controller 30 via electrode wirings (not illustrated) or the like. The driving controller 30 supplies a driving signal for controlling the piezoelectric device 11 and controls the frequency and power of the driving signal in order to drive the piezoelectric actuator 100 with high efficiency and in a stable state.

The vibrating plate 10 includes a sliding portion 15 that is extended from one end in the longitudinal direction thereof so as to protrude toward the rotor 2 farther than the piezoelectric device 11. The sliding portion 15 is in contact with a side surface (circumferential surface) of the rotor 2.

Moreover, the vibrating plate 10 includes a pair of arm portions 16 that is provided at the center in the longitudinal direction thereof so as to extend toward both outer sides in the lateral direction. A through-hole is formed in the arm portion 16 so as to penetrate in the thickness direction, and the arm portion 16 is fixed to the holding member 3 via a screw inserted into the through-hole. In this way, the vibrating body 1 is held on the holding member 3 in a state where the vibrating body 1 can perform longitudinal vibration and flexural vibration about the arm portion 16.

The rotor 2 has a disk shape and is disposed on a side of the vibrating body 1 where the sliding portion 15 is provided. The rotor 2 is held so as to be rotatable about a rod-shaped shaft 2a that stands on the base 18. The rotating speed of the rotor 2 can be detected by an optical or magnetic rotation sensor (not illustrated) that is provided near the rotor 2.

The base 18 includes a pair of slide portions 18a. The pair of slide portions 18a is disposed on both outer sides in the lateral direction of the vibrating body 1 so as to extend in the longitudinal direction. The holding member 3 is supported on the base 18 so as to be slidable along the slide portions 18a.

A bias spring 4 is provided between the base 18 and a side of the holding member 3 opposite to the rotor 2. The bias spring 4 biases the vibrating body 1 toward the rotor 2 via the holding member 3, and by this biasing force, the sliding portion 15 is in contact with the rotor 2 with predetermined force. The biasing force of the bias spring 4 is appropriately set so that appropriate frictional force is generated between the rotor 2 and the sliding portion 15. In this way, vibration of the vibrating body 1 is efficiently transferred to the rotor 2 via the sliding portion 15.

The piezoelectric actuator 100 may further include a mechanism that increases or decreases the rotating speed of the rotor 2 and transfers the increased or decreased rotating speed. When such a mechanism is included, it is possible to increase or decrease the rotating speed of the rotor 2 to obtain a desired rotating speed.

Figure 2A:
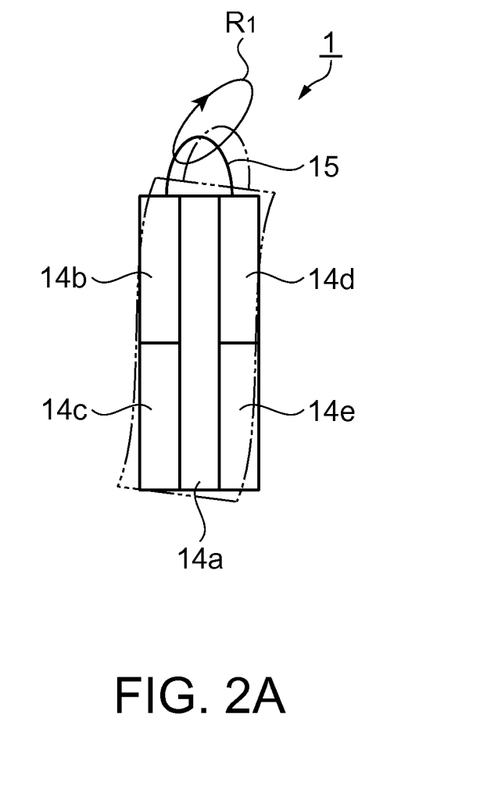
FIGS. 2A and 2B are diagrams illustrating a vibrational behavior of a vibrating body according to the first embodiment.
Figure 2B:
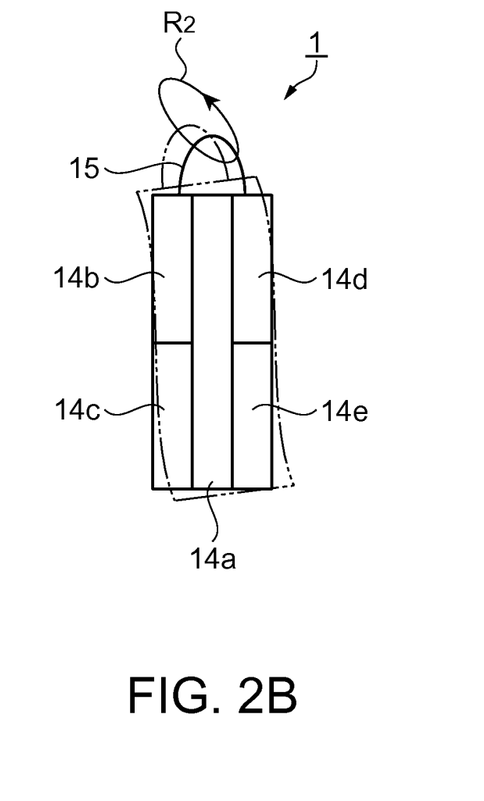

Subsequently, the operation of the piezoelectric actuator 100 is described. FIGS. 2A and 2B are diagrams illustrating a vibrational behavior of the vibrating body according to the first embodiment. Specifically, FIG. 2A is a diagram illustrating a vibrating state of the vibrating body 1 when a driving signal is supplied between the first electrode 12 (see FIG. 1B) and the electrode portions 14a, 14b, and 14e of the second electrode 14. Moreover, FIG. 2B is a diagram illustrating a vibrating state of the vibrating body 1 when a driving signal is supplied between the first electrode 12 and the electrode portions 14a, 14c, and 14d of the second electrode 14.

In the vibrating state illustrated in FIG. 2A, when a driving signal is supplied to the electrode portion 14a which is a longitudinal vibration electrode, longitudinal vibration is excited in the vibrating body 1 so that the vibrating body expands or contracts in the longitudinal direction. Moreover, when a driving signal is supplied to the electrode portions 14b and 14e which are the first flexural vibration electrodes, flexural vibration is excited in the vibrating body 1 so that the vibrating body 1 bends in the lateral direction. The longitudinal vibration and the flexibility are combined so that vibration indicated by a two-dot chain line is excited in the vibrating body 1, whereby the sliding portion 15 slides so as to rotate clockwise along an elliptical orbit R1. In this way, the rotor 2 rotates counterclockwise as indicated by an arrow in FIG. 1A.

In this case, the vibrating body 1 (the piezoelectric device 11) vibrates also in the second flexural vibration electrodes (the electrode portions 14c and 14d) to which a driving signal is not supplied. By this vibration, the piezoelectric device 11 generates electricity in the region of the second flexural vibration electrodes, and a detection signal (AC current) corresponding to vibration is output from the electrode portions 14c and 14d.

In the vibrating state illustrated in FIG. 2B, when a driving signal is supplied to the electrode portion 14a which is the longitudinal vibration electrode, longitudinal vibration is excited in the vibrating body 1 so that the vibrating body 1 expands or contracts in the longitudinal direction. Moreover, when a driving signal is supplied to the electrode portions 14c and 14d which are the second flexural vibration electrodes, flexural vibration is excited in the vibrating body 1 so that the vibrating body 1 bends in the lateral direction. The longitudinal vibration and the flexural vibration are combined so that vibration indicated by a two-dot chain line is excited in the vibrating body 1, whereby the sliding portion 15 slides so as to rotate counterclockwise along an elliptical orbit R2 by being inclined to be bilaterally symmetrical to the elliptical orbit R1. In this way, the rotor 2 rotates clockwise opposite to the arrow illustrated in FIG. 1A.

In this case, when the vibrating body 1 vibrates, the piezoelectric device 11 generates electricity in the region of the first flexural vibration electrodes (the electrode portions 14b and 14e) to which the driving signal is not supplied. In this way, a detection signal (AC current) corresponding to the vibration of the vibrating body 1 is output from the electrode portions 14b and 14e.

As above, in the piezoelectric actuator 100 of the present embodiment, when supplying a driving signal between the first electrode 12 and the second electrode 14, by switching between a case of selecting the first flexural vibration electrode (the electrode portions 14b and 14e) in addition to the longitudinal vibration electrode (the electrode portion 14a) in the second electrode 14 and a case of selecting the second flexural vibration electrode (the electrode portions 14c and 14d), it is possible to rotate the rotor 2 both clockwise and counterclockwise.

Moreover, in the piezoelectric actuator 100, in a state where the sliding portion 15 slides so as to properly rotate along the elliptical orbit R1 or the elliptical orbit R2, the rotor 2 rotates stably and the rotating speed and torque reach substantially their maximum. In the present embodiment, such a driving state will be referred to as an optimum elliptical driving state.

Driving Controller

Next, the configuration of the driving controller of the piezoelectric actuator 100 will be described with reference to FIG. 3. FIG. 3 is a block diagram illustrating the configuration of the driving controller of the piezoelectric actuator according to the first embodiment. As illustrated in FIG. 3, the driving controller 30 includes a frequency controller 20 as a controller, a driving voltage controller 24, an oscillator 25, a driving circuit 26 as a driving unit, a phase difference detecting circuit 27 as a phase difference detector, an amplitude detecting circuit 28, and a selector 29.

The phase difference detecting circuit 27 detects a phase difference between a driving signal and a detection signal detected based on the vibration of the vibrating body 1 and outputs a signal corresponding to the detected phase difference to the frequency controller 20 (a phase difference comparator 21). The amplitude detecting circuit 28 detects the amplitude of the detection signal detected based on the vibration of the vibrating body 1 and outputs a signal corresponding to the detected amplitude to the frequency controller 20 (an amplitude comparator 22).

The frequency controller 20 includes the phase difference comparator 21, the amplitude comparator 22, and a state transition controller 23. The phase difference comparator 21 compares the phase difference output by the phase difference detecting circuit 27 with a target phase difference value which is a predetermined reference value. The amplitude comparator 22 compares the amplitude output by the amplitude detecting circuit 28 with a target amplitude value. The target phase difference value and the target amplitude value are values set in advance and are stored in a storage unit (not illustrated) included in the frequency controller 20. The storage unit may be a memory or the like provided separately from the frequency controller 20.

The state transition controller 23 outputs a voltage value per predetermined time and a frequency value per predetermined time to the driving voltage controller 24 and the oscillator 25, respectively, based on the phase difference comparison result by the phase difference comparator 21 and the amplitude comparison result by the amplitude comparator 22. Moreover, the state transition controller 23 has five different states, and transitions the state thereof and adjusts the voltage value per predetermined time and the frequency value per predetermined time in respective states based on the phase difference comparison result by the phase difference comparator 21 and the amplitude comparison result by the amplitude comparator 22.

The oscillator 25 generates a driving signal to be supplied to the vibrating body 1 (the piezoelectric device 11). The oscillator 25 is configured of a direct digital synthesizer (DDS) and adjusts the frequency (hereinafter referred to as a driving frequency) of the driving signal based on the frequency value per predetermined time output from the state transition controller 23.

The driving voltage controller 24 outputs an instruction to increase or decrease the voltage of the driving signal to the driving circuit 26 based on the voltage value per predetermined time output from the state transition controller 23. The driving circuit 26 increases or decreases the voltage of the driving signal based on the instruction of the driving voltage controller 24 and outputs the driving signal to the vibrating body 1 (the piezoelectric device 11). In this way, the voltage value is controlled as the power of the driving signal supplied to the vibrating body 1.

The selector 29 switches the electrode to which the driving signal is supplied and the electrode to which the detection signal is output among the electrodes of the piezoelectric device 11. By the switching of the selector 29, one of the first and second flexural vibration electrodes is selected, and the vibrating state illustrated in FIG. 2A and the vibrating state illustrated in FIG. 2B are switched. In this way, it is possible to rotate the rotor 2 (see FIG. 1A) both clockwise and counterclockwise.

Figure 4:
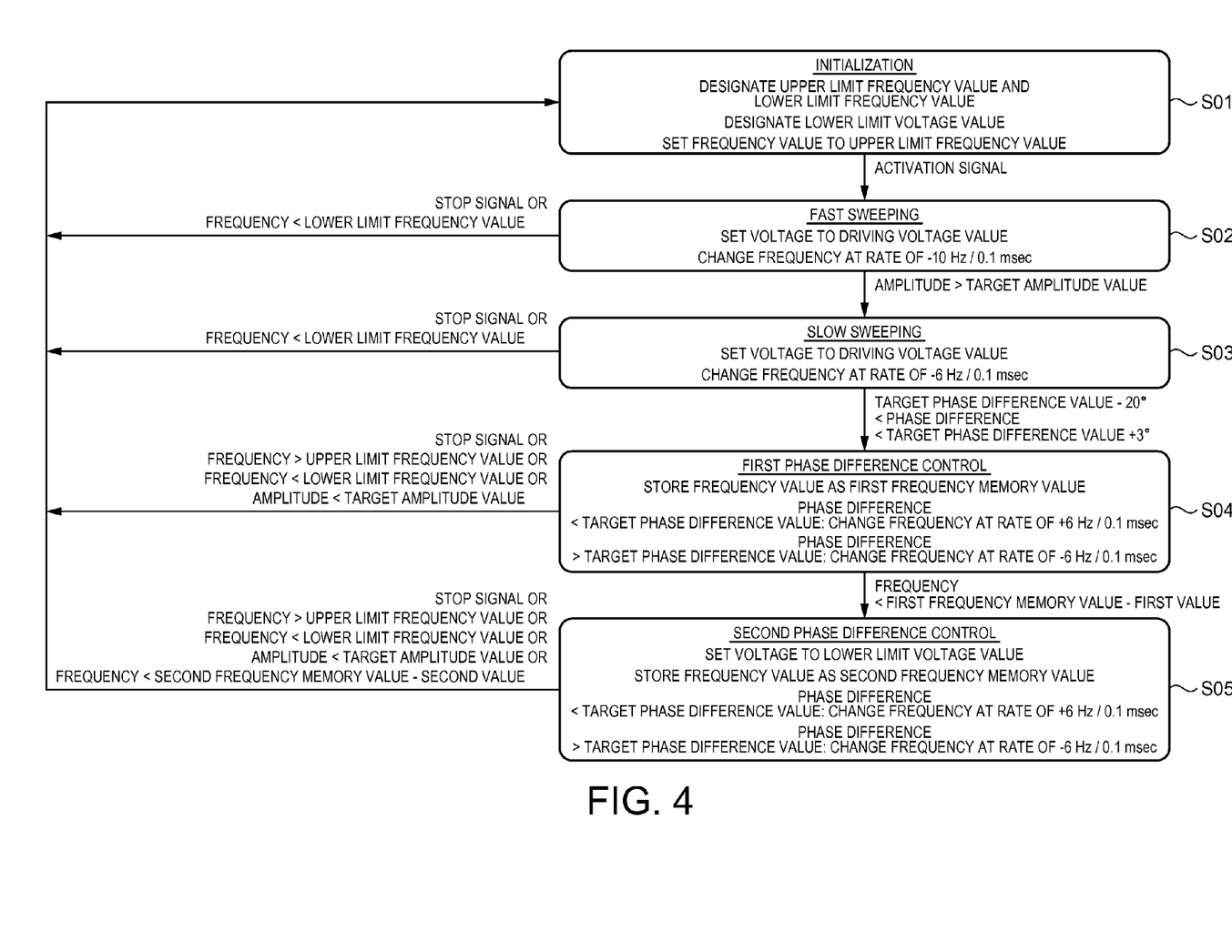
FIG. 4 is a diagram illustrating a state transition of the piezoelectric actuator according to the first embodiment.

Subsequently, a driving control method of the piezoelectric actuator 100 will be described with reference to FIG. 4. FIG. 4 is a diagram illustrating a state transition of the piezoelectric actuator according to the first embodiment. As illustrated in FIG. 4, the piezoelectric actuator 100 has five different control states which are an initialization state of S01, a fast sweeping state of S02, a slow sweeping state of S03, a first phase difference control state of S04, and a second phase difference control state of S05. Transition between these different states and control of the respective states are performed by the state transition controller 23.

The piezoelectric actuator 100 is in a stopped state in the initialization state of S01. When an activation signal is input, the piezoelectric actuator 100 transitions to the first phase difference control state of S04 and the second phase difference control state of S05 through the fast sweeping state of S02 and the slow sweeping state of S03.

In the initialization state of S01, the state transition controller 23 designates a frequency range and lower limit voltage value range in which the piezoelectric actuator 100 is driven. The upper limit value (upper limit frequency value) and the lower limit value (lower limit frequency value) of the frequencies when performing sweeping control are designated as the frequency range. The lower limit voltage value is preferably a voltage at which the piezoelectric device 11 vibrates so that the phase difference can be detected, and a voltage at which the rotor 2 does not rotate.

Moreover, in the initialization state of S01, the state transition controller 23 sets the frequency value output to the oscillator 25 at the time of activation to the upper limit frequency value. That is, in the fast sweeping state of S02 and the slow sweeping state of S03 after activation, sweeping control of frequency is performed in such a way as to sweep frequencies from a high frequency side to a low frequency side. The initialization state of S01 is maintained until an activation signal is input.

In the initialization state of S01, a surrounding temperature $T_0$ of the piezoelectric actuator 100 is measured using a thermometer or the like. In the initialization state of S01, the temperature of the piezoelectric actuator 100 (the vibrating body 1) can be regarded to be substantially the same as the surrounding temperature $T_0$.

When an activation signal is input in the initialization state of S01, the electrode to which the driving signal is supplied and the electrode to which the detection signal is output are set by the selector 29, and the rotating direction of the rotor 2 is determined. Moreover, the driving signal is supplied to the vibrating body 1 (the piezoelectric device 11) by the driving circuit 26, and the piezoelectric actuator 100 transitions to the fast sweeping state of S02.

In the fast sweeping state of S02, the state transition controller 23 sets the voltage value output to the driving voltage controller 24 to a driving voltage value. Moreover, the state transition controller 23 changes the frequency value output to the oscillator 25 from the upper limit frequency value at a certain rate of change (for example, −10 Hz/0.1 msec).

In the fast sweeping state of S02, when the amplitude comparator 22 detects that the amplitude output from the amplitude detecting circuit 28 is greater than a target amplitude value, the state transition controller 23 transitions to the slow sweeping state of S03. Moreover, in the fast sweeping state of S02, when the frequency value output to the oscillator 25 becomes lower than the lower limit frequency value, or when a stop signal is input, the state transition controller 23 transitions to the initialization state of S01.

In the slow sweeping state of S03, the state transition controller 23 maintains a state where the voltage value output to the driving voltage controller 24 is set to the driving voltage value. Moreover, the state transition controller 23 changes the frequency value output to the oscillator 25 at a rate of change (for example, −6 Hz/0.1 msec) lower than the rate of change in the fast sweeping state of S02.

In the slow sweeping state of S03, when the phase difference comparator 21 detects that the phase difference output from the phase difference detecting circuit 27 falls within a predetermined range, for example, a range between "target phase difference value −20°" and "target phase difference value +3°," the state transition controller 23 transitions to the first phase difference control state of S04. Moreover, in the slow sweeping state of S03, when the frequency value output to the oscillator 25 becomes lower than the lower limit frequency value, or when a stop signal is input, the state transition controller 23 transitions to the initialization state of S01.

The piezoelectric actuator 100 of the present embodiment can increase an activation speed by sweeping frequencies at a high speed in the fast sweeping state of S02 and reliably transition to the first phase difference control state of S04 by switching to the slow sweeping state of S03 and sweeping frequencies at a low speed.

In the first phase difference control state of S04, the state transition controller 23 stores the frequency value at that time in a storage unit as a first frequency memory value. By monitoring a change of frequency after the state transitions to the first phase difference control state of S04 based on the first frequency memory value, it is possible to detect a temperature rise in the vibrating body 1. The piezoelectric actuator 100 is stably driven with high efficiency when the state transitions to the first phase difference control state of S04 where the phase difference is within a predetermined range.

In the first phase difference control state of S04, the state transition controller 23 performs control so that the phase difference output from the phase difference detecting circuit 27 approaches a target phase difference value. That is, when the phase difference output from the phase difference detecting circuit 27 is smaller than a target phase difference value, the state transition controller 23 changes the frequency value output to the oscillator 25 at a certain rate of change (for example, +6 Hz/0.1 msec). When the phase difference output from the phase difference detecting circuit 27 is larger than the target phase difference value, the state transition controller 23 changes the frequency value output to the oscillator 25 at a certain rate of change (for example, −6 Hz/0.1 msec).

By this control, the phase difference output from the phase difference detecting circuit 27 approaches the target phase difference value, and the frequency value output to the oscillator 25 converges substantially to an optimum driving frequency described later. In this way, the piezoelectric actuator 100 can obtain a desired rotating speed and a desired torque, and can be driven along an optimum elliptical orbit.

In the first phase difference control state of S04, the state transition controller 23 transitions to the second phase difference control state of S05 when the frequency value output to the oscillator 25 has changed from the first frequency memory value by an amount exceeding a first value determined in advance based on the temperature characteristics of the resonance frequency of the vibrating body 1, that is when the driving frequency becomes lower than a value obtained by subtracting the first value from the first frequency memory value. The first value is a value set in order to detect that the temperature of the vibrating body 1 has reached an upper limit temperature described later at which the piezoelectric actuator 100 can operate stably. Thus, when it is detected that the temperature of the vibrating body 1 has reached the upper limit temperature at which the piezoelectric actuator 100 can operate stably, the state transition controller 23 transitions from the first phase difference control state of S04 to the second phase difference control state of S05.

In the first phase difference control state of S04, the state transition controller 23 transitions to the initialization state of S01 when the frequency value output to the oscillator 25 becomes higher than the upper limit frequency value or lower than the lower limit frequency value, or when the amplitude output from the amplitude detecting circuit 28 becomes smaller than the target amplitude value, or when a stop signal is input.

When transitioning to the second phase difference control state of S05, the state transition controller 23 stores the frequency value at that time in the storage unit as a second frequency memory value. By monitoring a change of frequency after the state transitions to the second phase difference control state of S05 based on the second frequency memory value, it is possible to detect a temperature rise in the vibrating body 1.

In the second phase difference control state of S05, the state transition controller 23 sets the voltage value output to the driving voltage controller 24 to a lower limit voltage value.

Moreover, similarly to the first phase difference control state of S04, when the phase difference output from the phase difference detecting circuit 27 is smaller than a target phase difference value, the state transition controller 23 changes the frequency value output to the oscillator 25 at a certain rate of change (for example, +6 Hz/0.1 msec). When the phase difference output from the phase difference detecting circuit 27 is larger than the target phase difference value, the state transition controller 23 changes the frequency value output to the oscillator 25 at a certain rate of change (for example, −6 Hz/0.1 msec).

In the second phase difference control state of S05, the state transition controller 23 transitions to the initialization state of S01 when the frequency value output to the oscillator 25 has changed from the second frequency memory value by an amount exceeding a second value determined in advance based on the temperature characteristics of the resonance frequency of the vibrating body 1, that is, when the driving frequency becomes lower than a value obtained by subtracting the second value from the second frequency memory value. The second value is a value set in order to detect that the temperature of the vibrating body 1 has reached an upper limit temperature described later at which the piezoelectric actuator 100 can operate stably. Thus, when it is detected that the temperature of the vibrating body 1 has reached the upper limit temperature at which the piezoelectric actuator 100 can operate stably, the state transition controller 23 transitions from the second phase difference control state of S05 to the initialization state of S01, sets the voltage value output to the driving voltage controller 24 to zero, and stops the supply of the driving signal.

In the second phase difference control state of S05, the state transition controller 23 transitions to the initialization state of S01 when the frequency value output to the oscillator 25 becomes higher than the upper limit frequency value or lower than the lower limit frequency value, or when the amplitude output from the amplitude detecting circuit 28 becomes smaller than the target amplitude value, or when a stop signal is input.

Figure 5A:
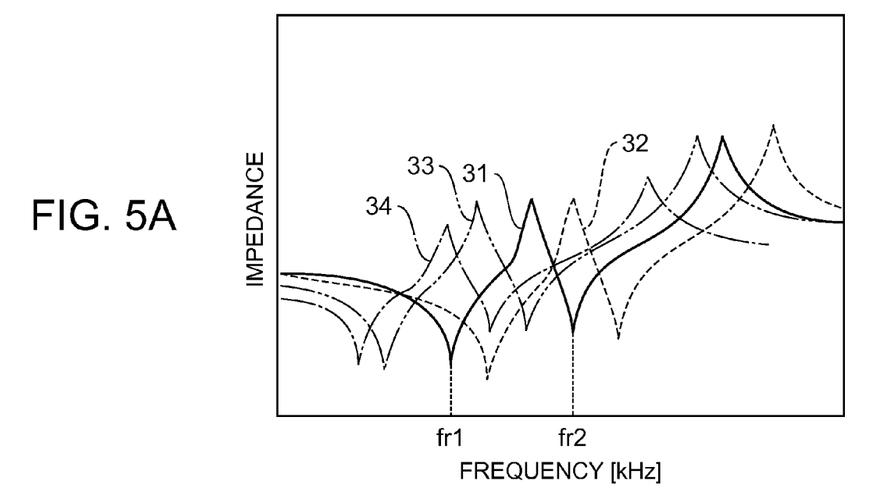
FIGS. 5A to 5C are diagrams illustrating the driving frequency of the piezoelectric actuator according to the first embodiment.
Figure 5B:
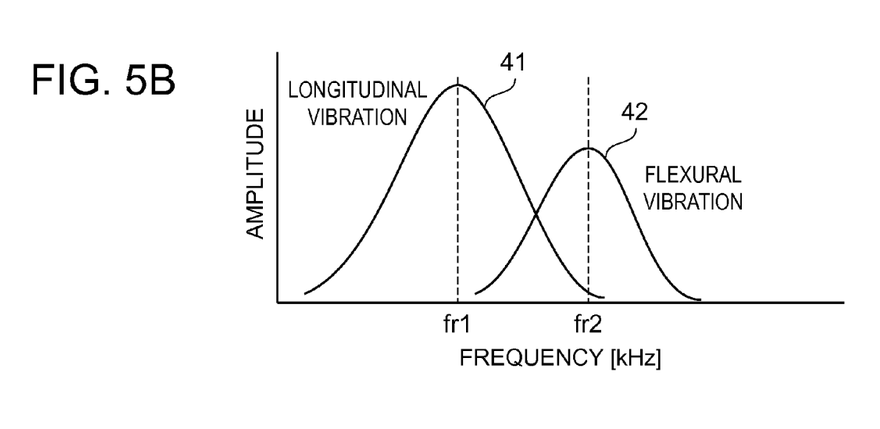
Figure 5C:
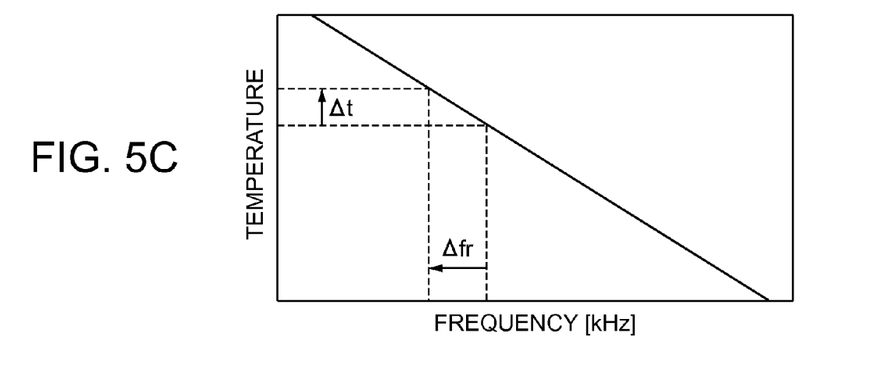

Here, the optimum driving frequency will be described with reference to FIGS. 5A to 5C. FIGS. 5A to 5C are diagrams illustrating the driving frequency of the piezoelectric actuator according to the first embodiment. Specifically, FIG. 5A is a diagram illustrating the relation between a driving frequency and an impedance, FIG. 5B is a diagram illustrating the relation between a driving frequency, amplitude of longitudinal vibration, and amplitude of flexural vibration, and FIG. 5C is a diagram illustrating the relation between the driving frequency and the temperature.

As indicated by a solid line 31 in FIG. 5A, two resonance points where impedance reaches its minimum appear with respect to the driving frequency. Among these resonance points, the point corresponding to the lower frequency is a resonance point of longitudinal vibration (fr1) and the point corresponding to the higher frequency is a resonance point of flexural vibration (fr2). The amplitude of the longitudinal vibration reaches its maximum at the longitudinal resonance frequency fr1 as indicated by a solid line 41 in FIG. 5B, and the amplitude of the flexural vibration reaches its maximum at the flexural resonance frequency fr2 as indicated by a solid line 42.

A frequency between the longitudinal resonance frequency fr1 of the longitudinal vibration and the flexural resonance frequency fr2 of the flexural vibration is referred to as the optimum driving frequency. When the vibrating body is driven at the optimum driving frequency, since the amplitude of both the longitudinal vibration and the flexural vibration is secured, the piezoelectric actuator 100 can be driven along an optimum elliptical orbit, and the piezoelectric actuator 100 is driven with high efficiency. Moreover, by setting the longitudinal resonance frequency fr1 and the flexural resonance frequency fr2 so as to approach each other, it is possible to further increase the amplitude of the longitudinal vibration and the flexural vibration at the optimum driving frequency. The upper limit frequency value and the lower limit frequency value of the piezoelectric actuator 100 can be determined by considering the longitudinal resonance frequency fr1 and the flexural resonance frequency fr2 of the vibrating body 1 and the like.

The impedance characteristics of the vibrating body 1 change with a temperature. In FIG. 5A, a solid line 31, a broken line 32, a two-dot chain line 33, and a one-dot chain line 34 represent the impedance characteristics when the temperature is 25° C., 0° C., 70° C., and 100° C. The resonance points of the longitudinal vibration and the flexural vibration move toward the high frequency side when the temperature decreases and move toward the low frequency side when the temperature increases. Thus, when the temperature of the vibrating body 1 changes due to heating caused by the surrounding temperature or the vibration of the vibrating body 1 itself, frictional force with the rotor 2, or the like, the resonance frequency also changes.

As above, since the resonance frequency changes with a change of a temperature or a load, when the piezoelectric actuator 100 is activated, control is performed so that the first phase difference control state of S04 is reliably and quickly attained by sweeping the frequencies in S02 and S03 so that the driving frequency approaches the resonance frequency. In this way, when the piezoelectric actuator 100 is used in a place where the temperature changes frequently, it is possible to attain the optimum elliptical driving state quickly even when the resonance frequency changes at the time of activation.

Moreover, even when the optimum elliptical driving state is attained for now, since the resonance frequency changes with a change of temperature, control is performed so as to adjust the driving frequency based on a difference between the phase difference and a target phase difference value in the first phase difference control state of S04 and the second phase difference control state of S05. In this way, the driving frequency is adjusted so that the phase difference approaches the target phase difference value to thereby maintain the stable driving state of the piezoelectric actuator 100.

However, as indicated by the two-dot chain line 33 in FIG. 5A, when the temperature reaches 70° C., since the resonance points of the longitudinal vibration and the flexural vibration move toward the low frequency side as compared to the case when the temperature is 25° C., the frequency deviates from a frequency range where the amplitudes of both the longitudinal vibration and the flexural vibration can be secured. In the present embodiment, 70° C. is the upper limit temperature at which the piezoelectric actuator 100 can operate stably. When the temperature exceeds 70° C., it becomes difficult for the piezoelectric actuator 100 to be driven along an optimum elliptical orbit, and the driving efficiency thereof decreases remarkably.

As indicated by the one-dot chain line 34 in FIG. 5A, when the temperature reaches 100° C., since the resonance points of the longitudinal vibration and the flexural vibration move further toward the low frequency side, the frequency deviates from a frequency range where the amplitudes of both the longitudinal vibration and the flexural vibration can be secured. In the present embodiment, 100° C. is the upper limit temperature at which the piezoelectric actuator 100 can operate properly. When the temperature exceeds 100° C., it becomes difficult for the piezoelectric actuator 100 to be driven along a normal elliptical orbit, damage or destruction such as detachment of the fixing portion of the vibrating body 1 may occur.

As above, when the temperature increases so that the resonance frequency of the vibrating body 1 decreases, the amplitude of the vibrating body 1 decreases, and the rotating speed of the rotor 2 decreases. Thus, the driving efficiency of the piezoelectric actuator 100 decreases. In such a case, in the driving control method of the related art, control is performed so as to increase the voltage of the driving signal in order to maintain the driving efficiency. However, when the voltage of the driving signal is increased, the vibrating body 1 generates heat so that the temperature increases further and the resonance frequency decreases further. This occurs repeatedly so that the system goes into a negative control chain. However, it becomes difficult for the piezoelectric actuator 100 to operate properly, and damage or destruction of the vibrating body 1 occurs.

Here, as illustrated in FIG. 5C, a change of the frequency of the vibrating body 1 is substantially linear to a change of the temperature thereof. Therefore, similarly to the first phase difference control state of S04 and the second phase difference control state of S05, in a state where the phase difference is within a predetermined range, by detecting a variation amount $\Delta fr$ of a frequency from an initial value, it is possible to detect that the temperature has changed and to predict a variation amount $\Delta t$ of a temperature from an initial value.

Moreover, the temperature of the vibrating body 1 increases when the vibrating body 1 itself vibrates. That is, the temperature increases from the temperature $T_0$ in the initialization state of S01 by the vibration of the vibrating body 1 itself until the state reaches the first phase difference control state of S04 through the fast sweeping state of S02 and the slow sweeping state of S03.

In the present embodiment, it can be understood based on experiment data that the variation amount ($\Delta fr$) of the resonance frequency and the variation amount ($\Delta t$) of the temperature are in such a relation that $\Delta fr$ per 1° C. of $\Delta t$ is $(269.8-279.7)/70=-0.14$ (KHz). Moreover, it can be understood that the variation amount $\Delta t_1$ of the temperature after the piezoelectric actuator 100 is activated from the initialization state of S01 and before the state transitions to the first phase difference control state of S04 is about 2° C. That is, the temperature $T_1$ of the vibrating body 1 when the state transitions to the first phase difference control state of S04 and the temperature $T_0$ in the initialization state of S01 are in such a relation that $T_1=T_0+2$ (° C.).

In this way, the first value described above, that is, the variation amount $\Delta fr_1$ of the frequency after the state transitions to the first phase difference control state of S04 and before the temperature of the vibrating body 1 has increased to 70° C. becomes $\Delta fr_1=-0.14\times(70-T_0-2)$ (KHz). Thus, in the first phase difference control state of S04, it can be predicted that when the driving frequency of the vibrating body 1 has decreased from the first frequency memory value by an amount of $\Delta fr_2$, the temperature has reached to the upper limit temperature at which the piezoelectric actuator 100 can operate stably. The temperature $T_0$ is a value measured as the surrounding temperature in the initialization state of S01.

Moreover, based on the relation between the variation amount ($\Delta fr$) of the resonance frequency and the variation amount ($\Delta t$) of the temperature, the second value described above, that is, the variation amount $\Delta fr_2$ of the frequency after the state transitions to the second phase difference control state of S05 and before the temperature of the vibrating body 1 has increased to 100° C. is $\Delta fr_2=-0.14\times(100-70)$ (KHz) which is about −5 (KHz). In this way, in the second phase difference control state of S05, it can be predicted that when the driving frequency of the vibrating body 1 has decreased from the second frequency memory value by an amount of $\Delta fr_2$, the temperature has reached the upper limit temperature at which the piezoelectric actuator 100 can operate properly.

Therefore, in the present embodiment, the first frequency memory value is stored as the initial value of the frequency when the state transitions to the first phase difference control state of S04. When the frequency has changed from the first frequency memory value to exceed the first value, it is determined that the temperature has reached the upper limit temperature at which the piezoelectric actuator 100 can operate stably, and the voltage is set to the lower limit voltage value. Moreover, the second frequency memory value is stored as the initial value of the frequency when the state transitions to the second phase difference control state of S05. When the frequency has changed from the second frequency memory value to exceed the second value, it is determined that the temperature has reached the upper limit temperature at which the piezoelectric actuator 100 can operate properly, and the voltage is set to zero.

Figure 6:
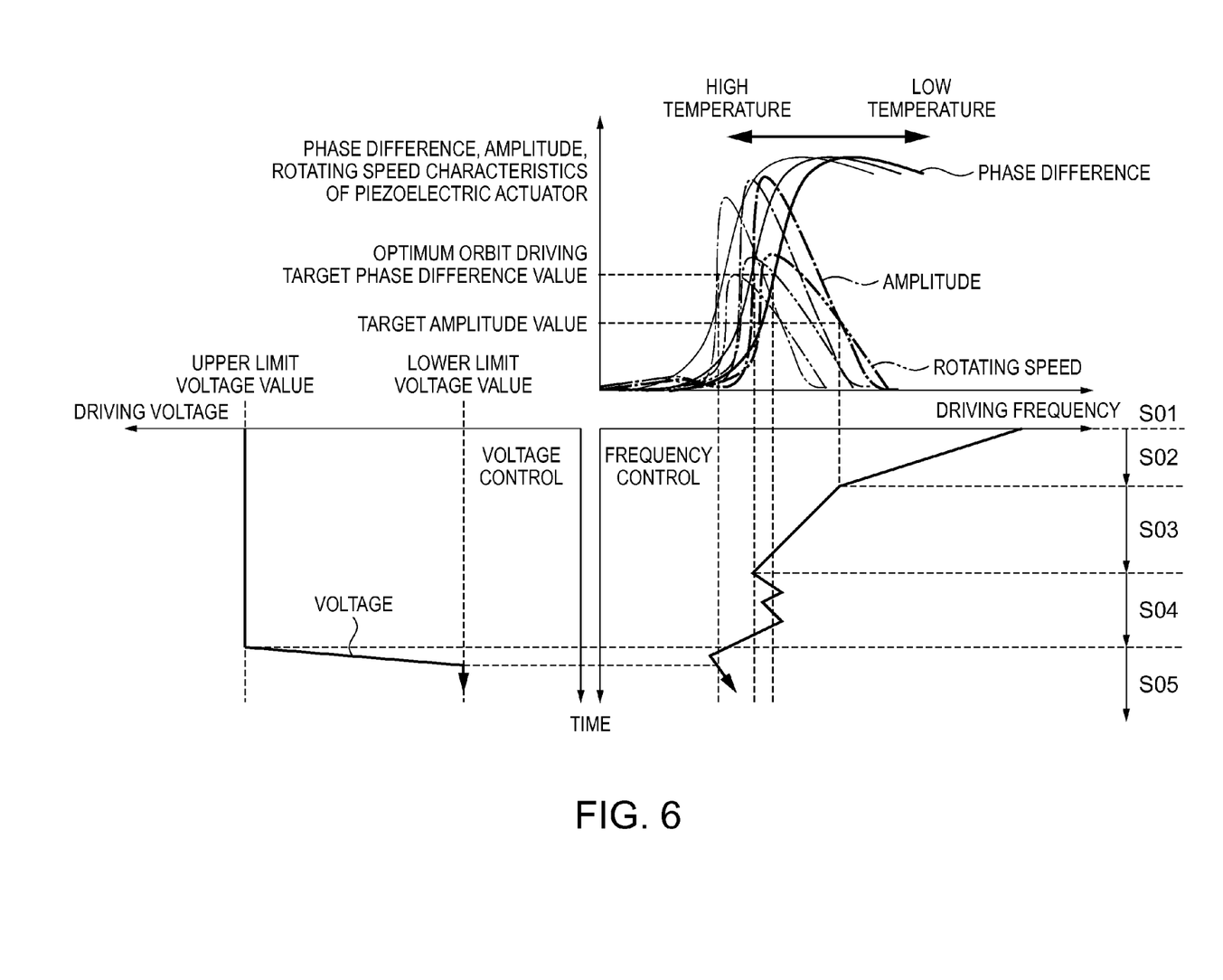
FIG. 6 is a diagram illustrating an example of driving control of the piezoelectric actuator according to the first embodiment.

Next, an example of driving control of the piezoelectric actuator 100 will be described with reference to FIG. 6. FIG. 6 is a diagram illustrating an example of driving control of the piezoelectric actuator according to the first embodiment. In FIG. 6, the horizontal axis advancing rightward from the center of the figure represents a change of the driving frequency, and the frequency increases as it advances rightward. The horizontal axis advancing leftward from the center of the figure represents a change of the driving voltage, and the voltage increases as it advances leftward. The vertical axis advancing upward from the center of the figure represents a change of the phase difference, amplitude, and rotating speed of the piezoelectric actuator 100, and the respective values increase as it advances upward. The vertical axis advancing downward from the center of the figure represents that the time elapses as it advances downward.

When the piezoelectric actuator 100 is activated from the initialization state of S01, the driving frequency changes from the upper limit frequency value toward the lower side in the fast sweeping state of S02. Then, the rotor 2 starts rotating, and the amplitude of the vibrating body 1 increases and the rotating speed of the rotor 2 also increases.

In this case, the phase difference output from the phase difference detecting circuit 27 becomes greater than the target phase difference value at which the optimum elliptical driving state can be realized. In the present embodiment, the driving frequency is changed at a high speed in the fast sweeping state of S02 so as to quickly skip a frequency range where the optimum elliptical driving state is not obtained.

Moreover, since the driving frequency is changed from the high frequency side, that is, from a side where the impedance of the vibrating body 1 is high, it is possible to decrease the possibility that the frequency passes through a resonance frequency where the impedance is low in the sweeping state. In this way, it is possible to prevent an excessive increase of the current of the piezoelectric actuator and a temperature rise caused by the increase of the current.

In the fast sweeping state of S02, when the amplitude output from the amplitude detecting circuit 28 becomes larger than the target amplitude value, the state transitions to the slow sweeping state of S03 so that the rate of change of the driving frequency is decreased. By decreasing the rate of change of frequency to be smaller than that of the fast sweeping state of S02, the phase difference is suppressed from exceeding the target phase difference value.

With a change of the driving frequency toward the low frequency side, the amplitude of the vibrating body 1 and the rotating speed of the rotor 2 increase further, and the phase difference decreases. Moreover, when the phase difference approaches the target phase difference value, both the amplitude of the vibrating body 1 and the rotating speed of the rotor 2 reach their maximum. That is, when the phase difference is controlled to be a value within a predetermined range which is set as a value near the target phase difference value, it is possible to realize the optimum elliptical driving state.

When the phase difference falls within the predetermined range, the state transitions to the first phase difference control state of S04. In the first phase difference control state of S04, since the optimum elliptical driving state is obtained, the voltage of the driving signal is set to the upper limit voltage value, and the amplitude of the vibrating body 1 and the rotating speed of the rotor 2 are increased. Moreover, by increasing or decreasing the driving frequency so as to follow a variation of the resonance frequency, it is possible to maintain stable driving with high efficiency.

In the first phase difference control state of S04, when the temperature of the piezoelectric actuator 100 (the vibrating body 1) increases due to a change of the surrounding temperature or a load, the resonance frequency decreases, and the amplitude and the rotating speed decrease. When the driving frequency of the vibrating body 1 has changed from the first frequency memory value by an amount exceeding the first value, it is determined that the temperature has reached the upper limit temperature at which the piezoelectric actuator 100 can operate stably, and the state transitions to the second phase difference control state of S05.

In this way, since the voltage of the driving signal supplied to the vibrating body 1 (the piezoelectric device 11) is set to the lower limit voltage value, it is possible to suppress a temperature rise in the piezoelectric actuator 100 and allow the piezoelectric actuator 100 to operate stably.

In the second phase difference control state of S05, when the temperature of the piezoelectric actuator 100 (the vibrating body 1) increases further due to a change of the surrounding temperature or a load, the resonance frequency decreases further, and the amplitude and the rotating speed decrease remarkably. When the driving frequency of the vibrating body 1 has changed from the second frequency memory value by an amount exceeding the second value, it is determined that the temperature has reached the upper limit temperature at which the piezoelectric actuator 100 can operate properly, and the state transitions to the initialization state of S01. In this way, since the voltage of the driving signal supplied to the vibrating body 1 (the piezoelectric device 11) is set to zero, it is possible to suppress a further temperature rise in the piezoelectric actuator 100. Moreover, it is possible to suppress an abnormal operation, damage, and destruction of the piezoelectric actuator 100 (the vibrating body 1).

Moreover, in the present embodiment, since a temperature rise can be predicted from a variation amount of a frequency, it is possible to control the frequency and temperature even when a temperature sensor is not included. Therefore, it is possible to prevent complication of a circuit configuration of a control unit, and an increase of the size and cost of the piezoelectric actuator, which may occur when a temperature sensor is added. In this way, it is possible to realize a decrease of the size and weight of the piezoelectric actuator 100 easily.

The relation between the variation amount ($\Delta$fr) of the resonance frequency and the variation amount ($\Delta$t) of the temperature and the variation amount $\Delta$t1 of the temperature after the piezoelectric actuator activates from the initialization state of S01 and before the piezoelectric actuator transitions to the first phase difference control state of S04 are not limited to the above but may be different depending on the configuration of the vibrating body 1.

Second Embodiment

Robot Hand

Figure 7A:
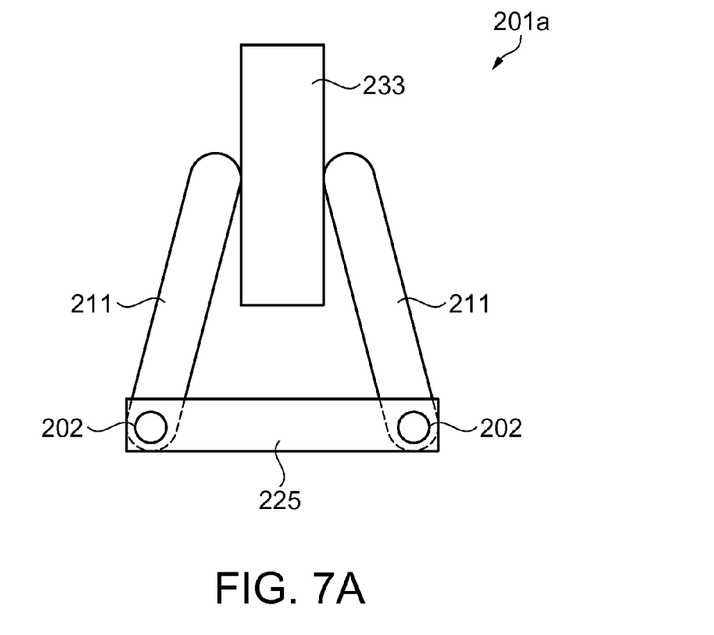
FIGS. 7A and 7B are schematic diagrams illustrating the configuration of a robot hand according to a second embodiment.
Figure 7B:
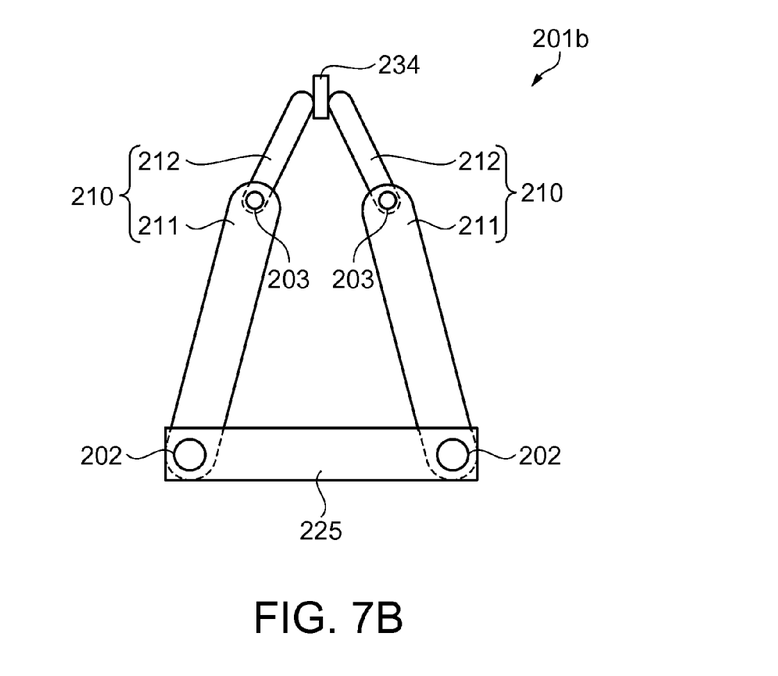

Next, a schematic configuration of a robot hand according to a second embodiment will be described. FIGS. 7A and 7B are schematic diagrams illustrating the configuration of a robot hand according to the second embodiment. Specifically, FIG. 7A is a diagram illustrating a robot hand including one stage of a joint portion, and FIG. 7B is a diagram illustrating a robot hand including two stages of a joint portion.

A robot hand 201a illustrated in FIG. 7A includes a base portion 225 and a pair of fingers 211. A pair of joint portions 202 is provided at both sides in the extension direction of the base 225. One end of each of the pair of fingers 211 is connected to the base 225 by the joint portion 202. The piezoelectric actuator 100 described above is disposed in the pair of joint portions 202, and by the driving of the piezoelectric actuator, the pair of fingers 211 is pivoted in different directions about the joint portions 202 as a pivot axis. In this way, a member 233 can be grasped by the other ends of the pair of fingers 211.

A robot hand 201b illustrated in FIG. 7B further includes a pair of fingers 212 in addition to the configuration of the robot hand 201a, and the fingers 211 and 212 form a finger portion 210. A joint portion 203 is disposed at each of the other ends of the pair of fingers 211, and one end of the finger 212 is connected to the finger 211 by the joint portion 203. The piezoelectric actuator 100 described above is disposed in the pair of joint portions 203, and by the driving of the piezoelectric actuator, the pair of fingers 212 is pivoted about the joint portions 203 as a pivot axis. In this way, by bending the pair of finger portions 210, a member 234 can be grasped by the other ends of the fingers 212. According to the configuration of the robot hand 201b, since the pair of finger portions 210 (the fingers 211 and 212) is connected by two stages of joints of the joint portions 202 and 203, it is ideal for grasping the member 234 smaller than the member 233.

In the robot hand 201a and the robot hand 201b according to the second embodiment, the joint portions 202 and 203 include the piezoelectric actuator 100 which operates stably and which is small and light. As a result, it is possible to provide the robot hand 201a or 201b which performs the operation of the fingers 211 and 212 grasping the member 233 or 234 in a stable state and which is small and light.

Third Embodiment

Robot

Figure 8:
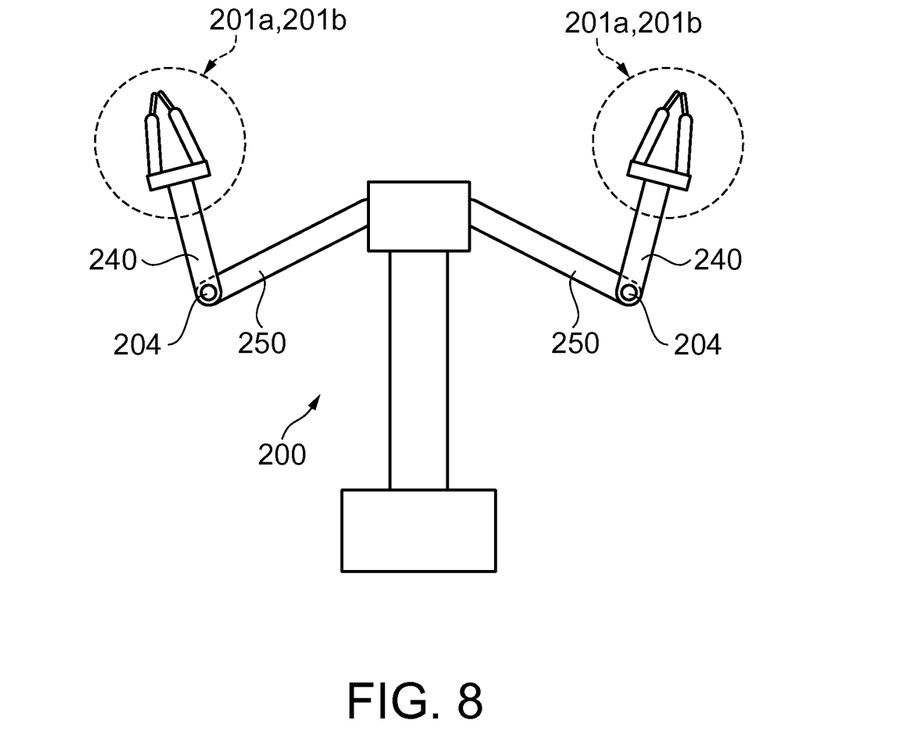
FIG. 8 is a schematic diagram illustrating the configuration of a robot according to a third embodiment.

Next, a schematic configuration of a robot according to a third embodiment will be described. FIG. 8 is a schematic diagram illustrating the configuration of a robot according to the third embodiment. As illustrated in FIG. 8, a robot 200 includes a pair of arms 240, a pair of arms 250, and a pair of robot hands 201a (or robot hands 201b). The arms 240 and 250 are connected together by a joint portion 204. The piezoelectric actuator 100 described above is disposed in a pair of joint portions 204, and by the driving of the piezoelectric actuator, the arm 240 is pivoted with respect to the arm 250.

In the robot 200 according to the third embodiment, the joint portion 204 includes the piezoelectric actuator 100 capable of being activated in a stable state and maintaining a stable driving state, and the robot 200 includes the robot hand 201a (or the robot hand 201b). As a result, it is possible to provide the robot 200 which performs the grasping of a member and the operation of the arm 240 in a stable state and which is small and light.

The embodiments described above illustrate just an aspect of the invention, and various modifications and applications can be made within the scope of the invention. Modification examples will be described below.

Modification Example 1

For example, in the embodiments described above, although a voltage is controlled as the power of the driving signal, the invention is not limited to this. The driving controller 30 may include a driving current controller instead of the driving voltage controller 24, and a current may be controlled as the power of the driving signal. By controlling the current of the driving signal, even when the impedance of the vibrating body 1 varies, it is possible to maintain the power to be substantially constant and to suppress a temperature rise in the vibrating body 1.

Modification Example 2

Moreover, in the embodiments described above, although the phase difference between the driving signal and the detection signal detected from the vibrating body 1 is detected, and the driving of the piezoelectric actuator 100 is controlled based on the detected phase difference, the invention is not limited to this. The detection signals of the longitudinal vibration and the flexural vibration may be detected from the vibrating body 1, and the driving of the piezoelectric actuator 100 may be controlled based on the phase difference between the driving signal and these detection signals.

Modification Example 3

Moreover, in the embodiments described above, although the driving frequency is controlled based on the phase difference between the driving signal and the detection signal or the phase difference between respective detection signals, the invention is not limited to this. For example, a resistor may be provided in the driving circuit 26 driving the piezoelectric actuator 100, and a change of the current flowing through the piezoelectric actuator 100 may be detected as a voltage value. In this way, the driving frequency may be controlled based on the current flowing through the piezoelectric actuator 100.

Modification Example 4

Moreover, in the embodiments described above, the rotor 2 is driven to rotate in two directions by the selector 29 switching the first flexural vibration electrode and the second flexural vibration electrode formed in the piezoelectric device 11, the invention is not limited to this. The driving phases of the longitudinal vibration electrode and the first flexural vibration electrode or the driving phases of the longitudinal vibration electrode and the second flexural vibration electrode may not necessarily be the same.

Furthermore, the resonance frequencies of the longitudinal vibration and the flexural vibration are made identical or close to each other, and three-phase driving is realized using three phases such that the first flexural vibration electrode has a phase delayed from that of the longitudinal vibration electrode, and the second flexural vibration electrode has a phase reverse to that of the first flexural vibration electrode. During reverse rotation, three-phase driving is realized using three phases such that the second flexural vibration electrode has a phase delayed from that of the longitudinal vibration electrode, and the first flexural vibration electrode has a phase reverse to that of the second flexural vibration electrode. The detection signal may be separately prepared by the embodiments or the modification examples, and the driving of the piezoelectric actuator 100 may be controlled.

The entire disclosure of Japanese Patent Application No. 2011-129878, filed Jun. 10, 2011 is expressly incorporated by reference herein.

What is claimed is:

1. A piezoelectric actuator comprising:
a vibrating body that includes a piezoelectric device;
a driving unit that supplies a driving signal to the piezoelectric device;
a phase difference detector that detects a phase difference between the driving signal and a detection signal detected based on vibration of the vibrating body; and
a control unit that controls the frequency and power of the driving signal,
wherein when the frequency of the driving signal is changed so that the phase difference falls within a predetermined range, the control unit stores the value of the frequency as a first frequency memory value, sets the power of the driving signal to a predetermined value, and performs control of adjusting the frequency of the driving signal so that the phase difference is maintained to be within the predetermined range, and
when the frequency of the driving signal is changed from the first frequency memory value by an amount exceeding a first value determined in advance based on temperature characteristics of a resonance frequency of the vibrating body, the control unit sets the power of the driving signal to a value smaller than the predetermined value.

2. The piezoelectric actuator according to claim 1,
wherein when the frequency of the driving signal is changed from the first frequency memory value by an amount exceeding the first value, the control unit stores the value of the changed frequency as a second frequency memory value, and
when the frequency of the driving signal is changed from the second frequency memory value by an amount exceeding a second value determined in advance based on the temperature characteristics, the control unit sets the power of the driving signal to zero.

3. The piezoelectric actuator according to claim 1,
wherein the control unit changes the frequency of the driving signal from a resonance frequency side where impedance is high toward a resonance frequency side where impedance is low among a resonance frequency of longitudinal vibration in which the vibrating body expands and contracts in a longitudinal direction of the vibrating body and a resonance frequency of flexural vibration in which the vibrating body expands and contracts in the lateral direction of the vibrating body.

4. A robot hand comprising:
a vibrating body including a piezoelectric device;
a driving unit that supplies a driving signal to the piezoelectric device;
a phase difference detector that detects a phase difference between the driving signal and a detection signal detected based on vibration of the vibrating body;
a control unit that controls the frequency and power of the driving signal; and
a plurality of finger portions, wherein when the frequency of the driving signal is changed so that the phase difference falls within a predetermined range, the control unit stores the value of the frequency as a first frequency memory value, sets the power of the driving signal to a predetermined value, and performs control of adjusting the frequency of the driving signal so that the phase difference is maintained to be within the predetermined range, and when the frequency of the driving signal is changed from the first frequency memory value by an amount exceeding a first value determined in advance based on temperature characteristics of a resonance frequency of the vibrating body, the control unit sets the power to a value smaller than the predetermined value.

5. A robot comprising:

a vibrating body including a piezoelectric device;

a driving unit that supplies a driving signal to the piezoelectric device;

a phase difference detector that detects a phase difference between the driving signal and a detection signal detected based on vibration of the vibrating body;

a control unit that controls the frequency and power of the driving signal; and a pivotable arm portion, wherein when the frequency of the driving signal is changed so that the phase difference falls within a predetermined range, the control unit stores the value of the frequency as a first frequency memory value, sets the power of the driving signal to a predetermined value, and performs control of adjusting the frequency of the driving signal so that the phase difference is maintained to be within the predetermined range, and when the frequency of the driving signal is changed from the first frequency memory value by an amount exceeding a first value determined in advance based on temperature characteristics of a resonance frequency of the vibrating body, the control unit sets the power to a value smaller than the predetermined value.

* * * * *